United States Patent Office 2,909,513
Patented Oct. 20, 1959

2,909,513

POLYMERIZATION OF ETHYLENE WITH AN INITIATOR CONTAINING TERTIARY ALKYL PERESTER AND TERTIARY ALKYL HYDROPEROXIDE

Sidney Charles Overbaugh, Wilmington, Del., assignor to E. I. du Pont de Nemours and Company, Wilmington, Del., a corporation of Delaware No Drawing. Application October 9, 1956
Serial No. 614,823

6 Claims. (Cl. 260—94.9)

This invention relates to the polymerization of ethylene in the presence of tertiary alkyl peresters of the formula

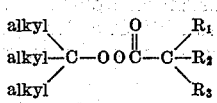

wherein $R_1$ and $R_2$ are alkyl groups and $R_3$ is a member of the class consisting of alkyl and hydrogen groups, and in the presence of a controlled amount of tertiary alkyl hydroperoxide.

Heretofore, it has been known that tertiary alkyl peresters are useful as initiators for the polymerization of olefinic compounds. Milas (J.A.C.S. 68, 642–3, 1946; U. S. 2,567,615) has disclosed methods for preparing peresters, and indeed certain peresters have become available commercially. These peresters are especially effective in the polymerization of ethylene, according to the methods described by Roedel in U. S. Patent 2,497,323, issued February 14, 1950. Among the peresters which have become obtainable is tertiary butyl perisobutyrate. This particular species has the remarkable property of possessing a half life substantially the same as that of benzoyl peroxide at optimum polymerization temperatures. Thus it can be employed quite satisfactorily in polymerization units designed for use at said temperatures. Moreover, tertiary butyl perisobutyrate has the advantage of being a liquid, while benzoyl peroxide is a solid having limited solubility in common solvents (e.g. 20% solubility in benzene). Furthermore, tertiary butyl perisobutyrate is much less shock-sensitive than benzoyl peroxide.

A significant disadvantage in the use of tertiary butyl perisobutyrate as an ethylene polymerization catalyst has been the difficulty in obtaining transparent polyethylenes in this manner, transparent polyethylenes being quite readily obtained by the use of benzoyl peroxide as catalyst. The present applicant has found that the lack of transparency in the perester-initiated polymers is due to the presence of hydroperoxide which is normally present in tertiary butyl perisobutyrate as obtained by the best methods heretofore employed. Ordinarily, this perester, as prepared heretofore, contained at least about 1.5% of tertiary butyl hydroperoxide.

It has now been found, in accordance with the present invention, that the hydroperoxide content of tertiary butyl perisobutyrate, or other perester as hereinafter disclosed, can be controlled at a relatively lower level, namely 0.05 to 0.2% based on the weight of perester, by washing the perester with an acidic buffered $Na_2SO_3$ solution, and that when the hydroperoxide content of this initiator is controlled at these levels and the initiator is fed into a "constant environment" ethylene polymerization unit, the polyethylenes which are obtained have greatly improved transparency. Furthermore, it has also been discovered according to this invention that the same phenomenon is encountered when the initiator is any perester of the formula

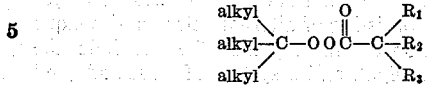

wherein $R_1$, $R_2$ and $R_3$ are defined as hereinabove set forth.

The phenomenon which has just been described occurs at polymerization temperatures of 150° to 230° C., and at pressures above 1000 atmospheres (preferably not in excess of 2000 atmospheres) and is most pronounced at short reaction times, e.g. less than two minutes. Under these conditions, relatively low conversions are obtained (conversion limited to about 10%) but rates of production are remarkably high. In such systems, there is no need for any substantial quantity of inert solvent, such as benzene or cyclohexane.

The hydroperoxide content of the catalyst is quite critical, for when the hydroperoxide content is uncontrolled or controlled at a level above 0.2% (by weight of the catalyst), the transparency of the polyethylene formed is markedly decreased, as shown in the following example. The theoretical explanation for this phenomenon is not known with certainty, but it is probably associated with the fact that in a "constant environment" system the hydroperoxide is relatively inactive, because there is no temperature peak during which hydroperoxide might be destroyed. In the "constant environment" method, there is always a detectable leakage of peroxide through the stirred autoclave or other device used for keeping conditions constant. If two peroxides are present, there is selective leakage of the less active chain initiator. Subsequent decomposition thereof during work-up of the product evidently causes grain due to cross-linking of the polymer molecules. If the hydroperoxide content is kept low enough it is largely consumed during the polymerization just as the perester is consumed (i.e. reduced to below 20 p.p.m. based on the weight of polyethylene in the resulting mixture), and as a result the product is free of grain-forming contaminant. The weight ratio for suppressing selective survival of hydroperoxide is about 500 perester:1 hydroperoxide, in accord with the present invention. This is illustrated further in the following examples.

EXAMPLE I

A specimen of commercial tertiary butyl perisobutyrate admixed with benzene (weight of benzene equal to one-third the weight of perester) contained 2.1% of tertiary butyl hydroperoxide. This was washed with an aqueous solution prepared as follows. To a one molar solution of sodium acetate, enough acetic acid was added to lower the pH to 4.5, and to the resulting mixture was added $Na_2SO_3$ (5% of the weight of $H_2O$). The washing was performed by using three volumes of the perester mixture per four volumes of the sulfite wash. Following this the perester mixture was given two water washes, in each of which two volumes of water were used per three volumes of the perester mixture. The perester mixture was dried by means of alumina, and the quantity of hydroperoxide, based on the weight of perester was found to be reduced to 0.06%. Other commercial samples of tertiary butyl perisobutyrate were treated in the same way, and the hydroperoxide content was reduced in each instance to 0.05%, 0.11%, and 0.09% respectively. Each of the resulting catalysts was used in ethylene polymerization, under the conditions substantially the same as those described below, with similar results. The ethylene polymerization reactor was of the "constant environment" continuous type. Ethylene pressure was maintained at 21,000 p.s.i., and temperature at 180° C. The catalyst mixture was injected at the rate of about 4 parts per 10,000 parts by weight of ethylene. Conversion to polyethylene was 9%. The product was withdrawn from the reactor, through a separator, and was extruded and cut into cubes. This polyethylene in the form of extruded film was tested for clarity in a device composed of a light source, two grids consisting of alternate clear and opaque sections, so positioned that together they exclude the transmission of the light, and a system of lenses adapted to form the image of the first grid on the second grid. The light escaping past the second grid is caught in a photo-electric cell and measured empirically thereby. The sample, when inserted in the path of the light, causes a response in the photo-electric cell. The clarity of the film is thus measurable and can be defined by the expression: $\log T = A - BI$ where A and B are constants and I is the response as measured on a millivoltmeter. The values for T given in the table are relative, rather than absolute. The film obtained in the experiment just described had a T value of 315 (cf. the table presented below).

The table reports the results obtained in experiments performed under substantially the same conditions, the effect of hydroperoxide contaminant on clarity of the polyethylene product (in film form) being as set forth below.

Table

EFFECT OF PERCENT TERTIARY BUTYL HYDROPEROXIDE IN TERTIARY BUTYL PERISOBUTYRATE, UPON CLARITY OF POLYETHYLENE FILM

| Wt. Percent Tertiary Butyl Hydroperoxide | Clarity(T) |
| --- | --- |
| 1.8 | 138 |
| 1.8 | 155 |
| 1.8 | 122 |
| 1.8 | 150 |
| 0.2 | 335 |
| 0.2 | 315 |
| 0.2 | 260 |
| 0.2 | 305 |
| 0.1 | 460 |
| 0.1 | 470 |
| 0.1 | 420 |
| 0.1 | 410 |

EXAMPLE II

Tertiary amyl perpivalate was prepared by reacting tertiary amyl hydroperoxide at 5° to 10° C. with trimethylacetyl chloride in the presence of a slight excess of pyridine, for one-half hour, washing the resulting mixture with water, and finally washing it with aqueous buffered $Na_2SO_3$. This initiator, when employed in the polymerization of ethylene as described in Example I, gave a polymer having higher transparency than polymer similarly prepared by using tertiary amyl perpivalate which had not been sulfite washed to remove hydroperoxide.

It is to be understood that the foregoing examples are illustrative and that numerous embodiments of the invention will occur to those skilled in the art. For instance, propane or other material which supplies end groups may advantageously be present. Also, various methods for controlling the hydroperoxide content of the catalyst may be employed if desired.

The polymerization vessel may be any continuous reactor, capable of withstanding the high pressures employed, provided, however, that the reaction mixture is stirred or otherwise agitated to minimize stratification. It is to be understood that at the extremely high pressures employed ethylene is a super-critical high density gas, which in effect dissolves solid polyethylene. At somewhat lower pressures within the range of operability there are two phases within the reactor. In any event, stirring or agitation of the dense gas is necessary to suppress stratification and by-passing. The entire mixture is maintained at the same temperature, and the composition thereof remains constant, even though throughput is at an extraordinarily rapid rate. The ratio of monomer to polymer can be held constant for indefinitely long periods in such a system. The catalyst is so rapidly consumed by chain initiation that the mixture, as withdrawn, is almost free of initiator. With tertiary butyl perisobutyrate as catalyst at 210°, for example, a contact time of about one minute gives a product having only a few p.p.m. of peroxide.

The polymer obtained by the method herein disclosed is especially valuable in film applications where clarity is an important factor, and where it is desired to take advantage of the physical properties of the tertiary alkyl peresters, instead of using benzoyl peroxide as above set forth.

What is claimed is the following:

1. A process for polymerizing ethylene in a continuous reactor under constant environment conditions at a temperature of 150° to 230° C. under a pressure above 1000 atmospheres in the presence of a polymerization initiator of the formula

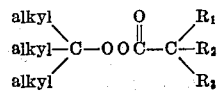

wherein the group

is of the class consisting of tertiary butyl and tertiary amyl, $R_1$ and $R_2$ are methyl groups and $R_3$ is a member of the class consisting of methyl and hydrogen groups, said initiator containing when introduced into the reactor a controlled quantity of tertiary alkyl hydroperoxide, said quantity being from 0.05 to 0.20% of the weight of the said initiator, continuing the reaction for a contact time of less than two minutes, whereby ethylene is polymerized at a conversion not in excess of 10%, and separating said polyethylene from the resulting mixture, said process being characterized further in that the transparency of said polyethylene, when extruded in the form of a film, is greater than that obtained under the same conditions by use of the same perester as initiator, but without precaution to maintain the hydroperoxide content as low as 0.20%.

2. Process of claim 1 wherein the pressure is not in excess of 2000 atmospheres.

3. Process of claim 2 wherein the perester is tertiary butyl perisobutyrate.

4. Process of claim 2 wherein the perester is tertiary amyl perpivalate.

5. Process of claim 2 wherein the mixture from which the polyethylene is separated contains no more than 20 parts by weight of perester per million parts of polyethylene.

6. The method of suppressing grain formation in polyethylene obtained by polymerization of ethylene in the presence of a tertiary alkyl perester of the formula set forth in claim 1, which comprises pre-treating said perester with aqueous acidic buffered sodium sulfite to remove hydroperoxide impurity from said perester.

References Cited in the file of this patent

UNITED STATES PATENTS 2,497,323    Roedel _____ Feb. 14, 1950